United States Patent [19]

Tetlak

[11] 3,905,086
[45] Sept. 16, 1975

[54] METHOD OF CONSTRUCTING AXLE HOUSING ASSEMBLY

[75] Inventor: Joseph F. Tetlak, Lyndhurst, Ohio

[73] Assignee: Willow Hill Industries, Inc., Willoughby, Ohio

[22] Filed: Jan. 28, 1974

[21] Appl. No.: 437,196

[52] U.S. Cl. .................. 29/428; 29/475; 29/482; 74/607; 180/88; 301/124 H
[51] Int. Cl.² .......................................... B23P 11/00
[58] Field of Search ............ 29/428, 482, 557, 470, 29/475; 74/607; 10/86 B; 301/124 R, 124 H; 140/88; 180/88

[56] References Cited
UNITED STATES PATENTS

| | | | |
|---|---|---|---|
| 1,955,824 | 4/1934 | Mogford et al. ...................... 74/607 |
| 1,978,685 | 10/1934 | Mogford et al. ...................... 29/482 |
| 2,569,452 | 10/1951 | Buckendale ........................... 74/607 |
| 2,656,594 | 10/1953 | Westling .............................. 29/428 |
| 2,752,673 | 7/1956 | Williams ......................... 301/124 R |
| 3,015,238 | 1/1962 | Williams ......................... 301/124 H |
| 3,613,195 | 10/1971 | Senior ................................ 140/88 X |
| 3,708,873 | 1/1973 | Floyd, Jr. .............................. 29/428 |

*Primary Examiner*—C. W. Lanham
*Assistant Examiner*—Victor A. DiPalma

[57] ABSTRACT

An improved axle housing assembly includes a brake plate support collar which is fixedly connected with an axle housing. In accordance with a feature of the present invention, the collar is formed from a single straight piece of metal bar stock. The bar stock has a generally circular cross sectional configuration. To form the collar, the bar stock is bent to a generally U-shaped configuration and then to a generally C-shaped configuration. The bent bar stock is then flattened to form a C-shaped collar blank having a generally rectangular cross sectional configuration. The fabricating of the collar is completed by forming a plurality of bolt holes in the collar blank. The collar is then connected to the axle housing.

11 Claims, 9 Drawing Figures

METHOD OF CONSTRUCTING AXLE HOUSING ASSEMBLY

BACKGROUND OF THE INVENTION

This invention relates generally to a method of forming an improved axle housing assembly and more particularly to a rear axle housing assembly having a brake plate support collar formed from a single piece of bar stock.

Many different vehicles have rear axle housings which are utilized to enclose a differential gear mechanism and rear axle shafts. The rear wheels and brakes are commonly mounted on the housing for movement relative to the frame of the vehicle. The rear brakes are frequently connected with the axle housing by a collar. One known type of rear axle housing assembly is disclosed in U.S. Pat. No. 1,978,685 and includes an axle housing to which a brake plate support collar is fixedly connected.

The brake support collar for another known axle assembly is fabricated from a generally rectangular piece of flat steel plate. Due to the annular configuration of the collar, the corner portions of the flat steel plate are scrapped. The amount of scrap is increased when the center portion of the collar is cut away to form a circular opening. The scrap rate is such that as much as 45 percent of the original steel plate may end up as scrap material.

SUMMARY OF THE PRESENT INVENTION

The present invention relates to an axle housing assembly and the method by which it is constructed. The axle housing assembly includes an axle housing to which a collar is connected to support a brake assembly. In accordance with the present invention, the collar is formed from a single piece of metallic bar stock. Since the collar is integrally formed from a single piece of bar stock, scrap is eliminated or at least minimized. It should be understood that the term bar stock, as utilized herein, contemplates not only pieces of material sold in straight rods but also coiled material which may commonly be referred to as wire.

To form the collar, the bar stock is bent so that it encloses an area having a configuration which is generally similar to the configuration of the outer surface of the portion of the axle housing to which the collar is to be connected. The bent piece of bar stock is then cold-worked to a desired cross sectional configuration. In one specific embodiment of the invention, the bent piece of bar stock was formed so as to have a generally rectangular cross sectional configuration with a flat side surface for engaging a brake assembly support plate.

Accordingly, it is an object of this invention to provide an axle housing assembly having a collar which is fabricated in such a manner as to minimize the formation of scrap material.

Another object of this invention is to provide a new and improved method of constructing a brake plate support collar for use in an axle housing assembly from a single piece of bar stock by bending and forming the bar stock to a desired configuration.

Another object of this invention is to provide a new and improved axle housing assembly which includes a brake plate support collar formed from a single piece of bar stock.

BRIEF DESCRIPTION OF THE DRAWINGS

The foregoing and other objects and features of the invention will become more apparent upon a consideration of the following description taken in connection with the accompanying drawings wherein.

DESCRIPTION OF ONE SPECIFIC PREFERRED EMBODIMENT OF THE INVENTION

Figure 1:
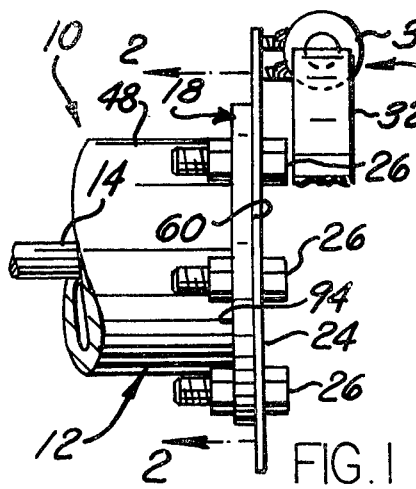
FIG. 1 is a schematic illustration of an axle housing assembly having a brake plate support collar constructed in accordance with the present invention.
Figure 2:
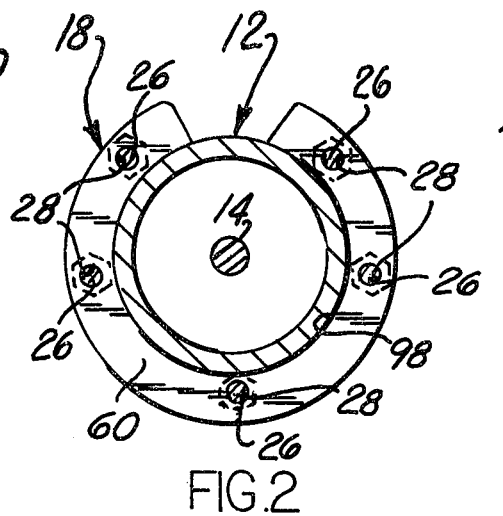
FIG. 2 is a sectional view, taken generally along the line 2—2 of FIG. 1, further illustrating the relationship of the brake plate support collar to the axle housing.

A rear axle housing assembly 10 constructed in accordance with the present invention is illustrated in FIG. 1 and includes an axle housing 12 which encloses a rear axle shaft 14 of a vehicle. The axle housing assembly 10 includes a collar 18 which is constructed in accordance with the present invention and is utilized to connect a rear brake assembly 20 with the axle housing 12. The collar 18 has a generally C-shaped configuration (FIG. 2) and is welded to the axle housing 12. A brake assembly support plate or disc 24 is fixedly connected with the collar 18 by suitable bolts 26 which extend through openings 28 in the collar 18.

In accordance with common practice, the brake assembly 20 includes a pair of brake shoes 32 (only one of which is shown in FIG. 1) which are connected with a wheel cylinder 34. The wheel cylinder 34 is fixedly connected with the brake assembly support plate or disc 24. Upon expansion of the wheel cylinder 34, the brake shoes 32 are moved outwardly to engage a brake drum (not shown) in a known manner. The mode of operation of the brake assembly 20 and the manner in which it is connected with the collar 18 are well known and will not be further described herein to avoid prolixity of description.

Figure 3:
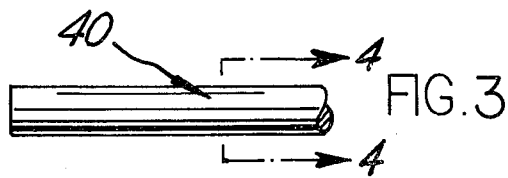
FIG. 3 is an illustration of a piece of bar stock from which the brake plate support collar of FIG. 2 is formed.

In accordance with a feature of the present invention, the collar 18 is formed from a single piece of metal bar stock 40 (see FIG. 3). By forming the collar 18 from a single piece of bar stock, scrap or waste material is eliminated, or at least minimized. Since the cost of fabricating the collar 18 is relatively low, a saving in scrap material can effect a substantial percentage reduction in the total cost of fabricating the collar. For example if the collar 18 were to be made by a known process in which the collar is cut from a rectangular piece of steel plate, approximately 45 percent of the material of the plate would be scrapped. By forming the collar 18 from a single piece of bar stock 40, the cost of fabricating the collar is substantially reduced.

It should be understood that the single piece of bar stock may, for reasons of economy, be obtained from a rolling mill in a coil which is commonly referred to as wire. Although many differnt sizes of wire could be utilized, steel wire having a ⅝ inch diameter has been utilized to make a collar similar to the collar 18. When the piece of bar stock 40 is obtained from a coil of wire, the wire is advantageously straightened and drawn to a predetermined diameter. The straightened wire is then cut to a desired length to form the piece of bar stock 40.

Figure 5:
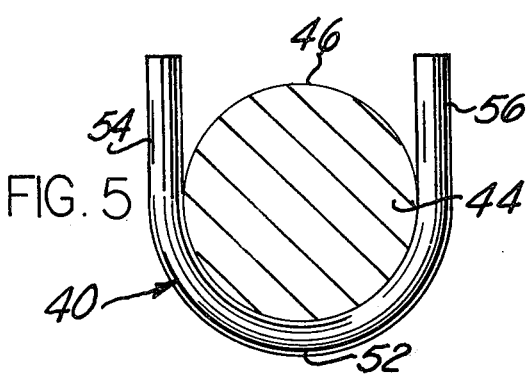
FIG. 5 is a schematic illustration depicting the bending of the bar stock of FIG. 3 to a generally U-shaped configuration.

To form the collar 18, the piece of steel bar stock 40 is first bent to a generally U-shaped configuration around a mandrel (FIG. 5) 44 having a cylindrical outer surface 46 with a diameter equal to the diameter of a cylindrical outer surface 48 (see FIG. 1) of the axle housing 12 on which the collar 18 is mounted. Once the bar stock 40 has been bent to a U-shaped configuration about the mandrel 44, it has a generally semicircular bight portion 52 and a pair of equal length leg portions 54 and 56. The inside radius of curvature of the bight portion 52 is the same as the radius of the outside surface 48 of the axle housing 12.

Figure 6:
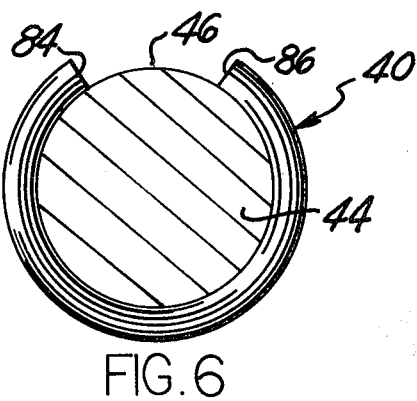
FIG. 6 is a schematic illustration, generally similar to FIG. 5, depicting the further bending of the U-shaped bar stock of FIG. 5 to a generally C-shaped configuration.

The bar stock 40 is further bent to a generally C-shaped configuration about the mandrel 44 (see FIG. 6). The piece of bar stock 40 is bent from the U-shaped configuration of FIG. 5 to the C-shaped configuration of FIG. 6 by pressing the leg portions 54 and 56 inwardly into tight abutting engagement with the outer surface 46 of the mandrel 44. Once the piece of bar stock 40 has been bent to the C-shaped configuration of FIG. 6, it substantially encloses a circular area which is the same size as the area enclosed by the circular outer surface 48 of the axle housing 21.

Figure 4:
FIG. 4 is a sectional view, taken generally along the line 4—4 of FIG. 3, illustrating the circular cross sectional configuration of the bar stock.

Although the bar stock 40 has the proper size and internal diameter for mounting on the axle housing 12, it still has the circular cross sectional configuration shown in FIG. 4. Since this cross sectional configuration does not lend itself to connection with the brake assembly support plate 24, the bent piece of bar stock 40 is flattened to form a mounting surface 60 which abuttingly engages the brake assembly support plate 24 (see FIGS. 1 and 2). The generally C-shaped piece of bar stock 40 is flattened by placing it in a die cavity 64 (FIG. 7) formed between a center post or stake 66 and a generally cylindrical forming wall 68. The center post 66 has a cylindrical outer forming surface 70 of the same diameter as the outer surface 48 of the axle housing 12 on which the collar 18 is to be mounted. Since the mandrel 44 about which the bar stock 40 was originally bent has the same diameter as the surface 48, the generally C-shaped piece of bar stock 40 fits snugly against the outer surface 70 of the center post 66 (see FIG. 7) when it is initially placed in the die cavity 64.

A ram or press head 74 is then removed toward a flat bottom surface 76 of the die cavity 64. As the ram head 74 comes down, the metal of the piece of bar stock 40 is pressed tightly against the cylindrical outer surface 70 of the center post 66 and is forced to flow radially outwardly into engagement with a cylindrical forming surface 78 formed on the inside of the wall 68 (see FIG. 8). The die cavity 64 is provided with a pair of end walls (not shown) which engage circular end surfaces 84 and 86 (see FIG. 6) of the generally C-shaped piece of bar stock 40 to prevent axial expansion of the piece of bar stock as the die head 74 compresses it in the cavity 64. The resulting collar blank 90 (see FIG. 8) has a flat, generally C-shaped support surface 60 which will abuttingly engage the support plate 24. The collar blank 90 is formed with a flat inner surface 94 (see FIG. 8) which extends parallel to the outer surface 60.

Figure 9:
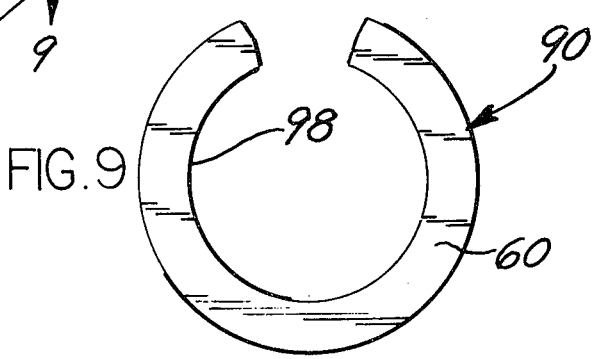
FIG. 9 is a plan view taken generally along the line 9—9 of FIG. 8, illustrating the configuration of a collar blank formed by the bent and flattened bar stock.

Formation of the collar 18 is completed by drilling the holes 28 (FIG. 2) at the desired locations. The generally C-shaped collar 18 is then welded to the axle housing 12. It should be noted that welding of the collar 18 to the axle housing 12 is facilitated by the fact that the generally C-shaped collar 18 is provided with a circular inner surface 98 (see FIG. 9) which forms part of a cylinder. The surface 98 abuttingly engages the generally cylindrical outer surface 48 of the axle housing 12. Therefore, the inner surface 98 positions the two major or face surfaces 60 and 94 of the collar 18 in a perpendicular relationship with the outer surface 48 of the axle housing.

In view of the foregoing description, it can be seen that the axle housing assembly 10 includes an axle housing 12 to which a collar 18 constructed in accordance with the present invention is fixedly connected. The brake assembly support plate 24 is bolted to the collar 18 to support the brake assembly 20 relative to the axle housing.

The formation of scrap material during the fabrication of the collar 18 is eliminated by forming the collar 18 from a single piece of bar stock 40. The piece of bar stock 40 has a circular cross sectional configuration. The bar stock 40 is first bent from a straight initial configuration to a generally U-shaped configuration. The curved portion of the U-shaped piece of bar stock has a radius of curvature equal to the radius of curvature of the outer surface 48 of the axle housing 12. The U-shaped piece of bar stock is then bent to a C-shaped configuration. As the bar stock is bent to the C-shaped configuration, the internal radius of curvature of the bar stock is maintained constant and equal to the radius of curvature of the outer surface 48 of the axle housing 12. In the disclosed embodiment of the invention the outer surface 48 of the axle housing 12 is cylindrical. However, it is contemplated that under certain circumstances the outer surface 48 may have other configurations. Of course, the piece of bar stock 40 would then be bent to conform to these configurations.

Figure 7:
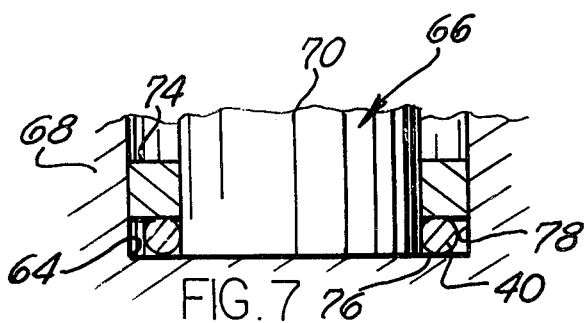
FIG. 7 is a schematic illustration depicting the bent bar stock of FIG. 6 in a press prior to flattening of the bar stock.
Figure 8:
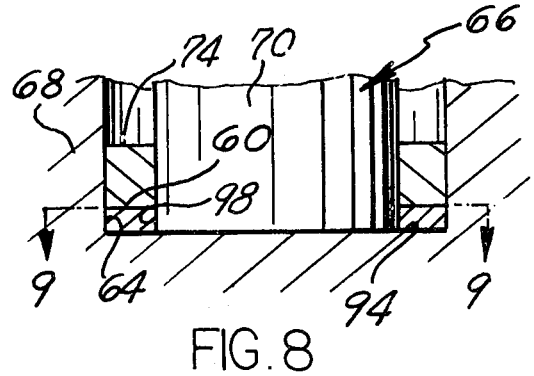
FIG. 8 is a schematic illustration depicting the flattening of the bent bar stock of FIG. 6 with the press of FIG. 7.

Once the piece of bar stock 40 has been bent to the C-shaped configuration of FIG. 6, it is flattened to a generally rectangular cross sectional configuration in the manner shown schematically in FIGS. 7 and 8. As the C-shaped piece of bar stock is flattened, the internal radius of curvature of the piece of bar stock is maintained constant. Therefore, the resulting C-shaped collar blank 90 has an internal surface 98 of the same radius of curvature as the outer surface 48 of the axle housing 12. This enables the internal surface 98 to abuttingly engage the outer surface 48 of the axle housing 12 throughout the length of the internal surface 98 to thereby position the major face surface surfaces 60 and 94 of the collar relative to the axle housing.

Having described one specific preferred embodiment of the invention, the following is claimed:

1. A method of constructing an axle housing assembly having a collar for use in connecting a portion of a brake assembly with an axle housing, said method comprising the steps of providing an axle housing having a portion with which the brake assembly is to be connected, forming the collar, and connecting the collar to the axle housing, said step of forming the collar including the steps of providing a piece of metallic bar stock having a generally circular cross sectional configuration, bending the piece of bar stock to a configuration in which it at least partially encloses an area having a configuration generally similar to the cross sectional configuration of the portion of the the axle housing to which the collar is to be connected, and thereafter forming the piece of bar stock so that it has a noncircular cross sectional configuration.

2. A method as set forth in claim 1 wherein said step of forming the piece of bar stock to a noncircular cross sectional configuration includes the step of forming a flat side surface on the piece of bar stock, said step of connecting the collar to the axle housing including the step of connecting the piece of bar stock to the axle housing with the flat side surface extending transversely to an outer surface of the axle housing.

3. A method as set forth in claim 1 wherein said step of forming the piece of bar stock to a noncircular cross sectional configuration includes the step of forming flat parallel side surfaces on the piece of bar stock, said step of connecting the collar to the axle housing including the step of connecting the piece of bar stock to the axle housing with the flat side surfaces extending transversely to an outer surface of the axle housing.

4. A method as set forth in claim 1 wherein said step of bending the piece of bar stock includes the step of bending a straight piece of bar stock to a generally U-shaped configuration and thereafter bending the piece of bar stock to a generally C-shaped configuration.

5. A method as set forth in claim 1 wherein said step of bending the piece of bar stock includes the step of bending of at least a portion of the bar stock to an arcuate configuration in which the arcuately curved portion of the bar stock has a predetermined radius of curvature, said step of forming the piece of bar stock so that it has a noncircular cross sectional configuration including the step of maintaining the radius of curvature of the arcuately curved portion of the piece of bar stock substantially constant.

6. A method as set forth in claim 1 wherein said step of forming the piece of bar stock to a noncircular cross sectional configuration includes the step of forming an inner surface, said step of connecting the collar to the axle housing including the step of connecting the piece of bar stock to the axle housing with the inner surface in abutting engagement with an outer surface of the axle housing.

7. A method as set forth in claim 6 wherein said step of forming the piece of bar stock to a noncircular cross sectional configuration further includes the step of forming on the piece of bar stock a flat side surface which extends perpendicular to the inner surface.

8. A method as set forth in claim 1 wherein said step of forming the piece of bar stock to a noncircular cross sectional configuration includes the step of providing a forming surface having the same configuration as the cross sectional configuration of the portion of the axle housing to which the collar is to be connected, locating the bent piece of bar stock adjacent to the forming surface, and applying pressure against opposite sides of the bent piece of bar stock to cold flow the metal of the piece of bar stock against the forming surface.

9. A method as set forth in claim 1 wherein said step of bending the piece of bar stock includes the step of bending a portion of the piece of bar stock into a generally semicircular configuration.

10. A method as set forth in claim 1 wherein said step of bending the piece of bar stock includes the step of bending at least a portion of the piece of bar stock to a generally semicircular configuration with a radius of curvature which is substantially the same as the radius of curvature of the outer surface of the portion of the axle housing to which the collar is to be connected, said step of forming the piece of bar stock to a noncircular cross sectional configuration being performed in such a manner as to maintain the radius of curvature of the semicircular portion of the piece of bar stock substantially constant.

11. A method of constructing an axle housing assembly having a collar for use in connecting a portion of a brake assembly with an axle housing, said method comprising the steps of providing an axle housing having a portion with which the brake assembly is to be connected, forming the collar, and connecting the collar to the axle housing, said step of forming the collar including the steps of providing a piece of metallic bar stock having a generally circular cross sectional configuration, bending the piece of bar stock to a configuration in which it at least partially encloses an area having a configuration generally similar to the cross sectional configuration of the portion of the axle housing to which the collar is to be connected, providing a forming surface having the same configuration as the cross sectional configuration of the portion of the axle housing to which the collar is to be connected, locating the bent piece of bar stock adjacent to the forming surface, forming on the bent piece of bar stock an inner surface having the same configuration as the cross sectional configuration of the portion of the axle housing to which the collar is to be connected by applying pressure against opposite sides of the bent piece of bar stock to cold flow the metal of the piece of bar stock against the forming surface, and forming a flat side surface on the bent piece of bar stock during the application of pressure against opposite sides of the bent piece of bar stock, said step of connecting the collar to the axle housing including the step of connecting the collar to the axle housing with the inner surface of the collar disposed in abutting engagement with an outer surface of the axle housing and with the flat side surface of the collar extending transversely to the outer surface of the axle housing.

\* \* \* \* \*